Figure 1:
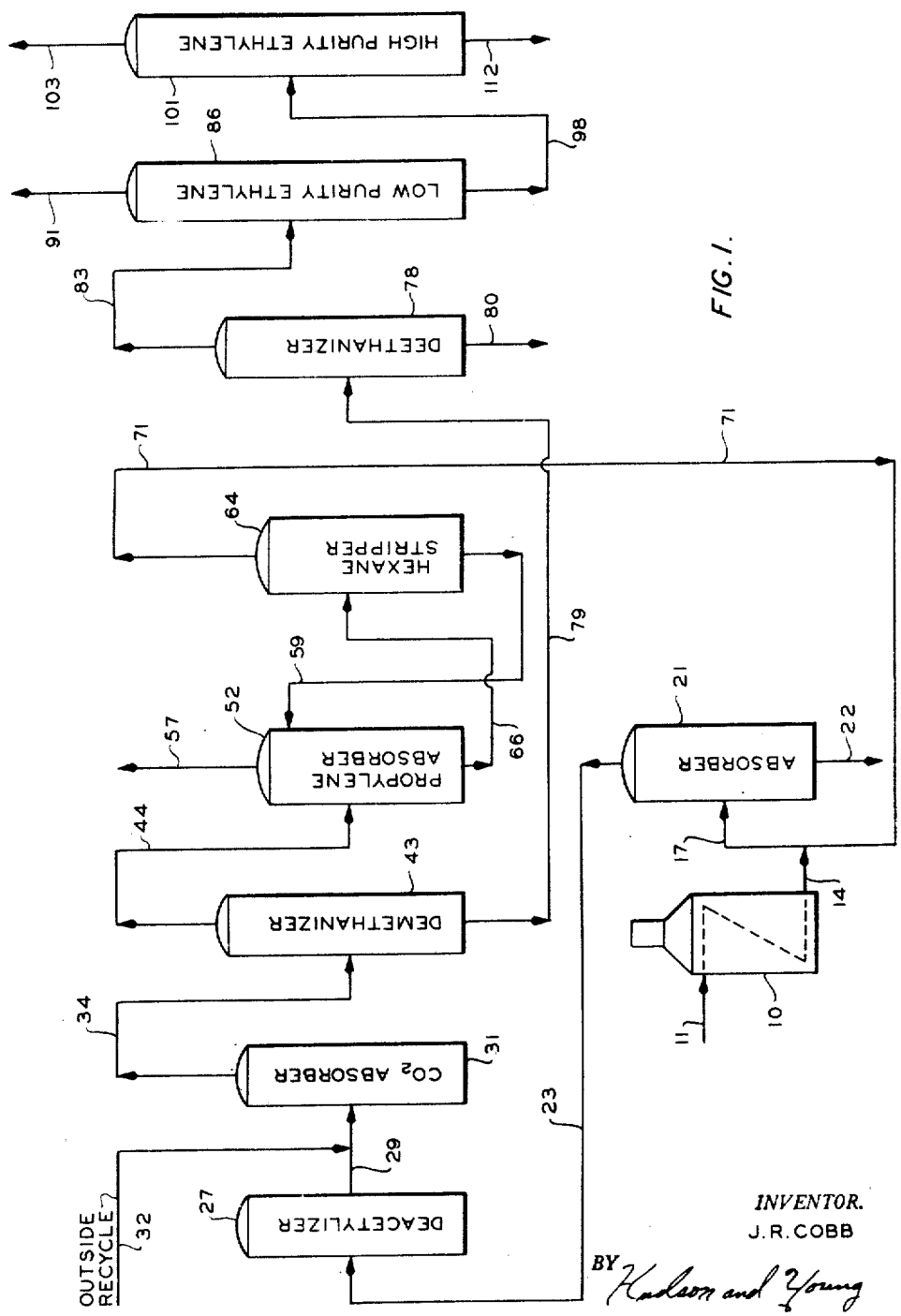

Nov. 19, 1957   J. R. COBB, JR   2,813,920
PRODUCTION OF ETHYLENE
Filed July 3, 1953   3 Sheets-Sheet 1

FIG. I.

INVENTOR.
J. R. COBB
BY Hadson and Young
ATTORNEYS

Nov. 19, 1957     J. R. COBB, JR     2,813,920
PRODUCTION OF ETHYLENE

Filed July 3, 1953     3 Sheets-Sheet 2

INVENTOR.
J. R. COBB
BY
Hudson and Young
ATTORNEYS

Nov. 19, 1957  J. R. COBB, JR  2,813,920
PRODUCTION OF ETHYLENE
Filed July 3, 1953  3 Sheets-Sheet 3

INVENTOR.
J. R. COBB
BY
Hudson and Young
ATTORNEYS

United States Patent Office 2,813,920
Patented Nov. 19, 1957

2,813,920

PRODUCTION OF ETHYLENE

Joseph R. Cobb, Jr., Bartlesville, Okla., assignor to Phillips Petroleum Company, a corporation of Delaware Application July 3, 1953, Serial No. 365,817

17 Claims. (Cl. 260—683)

This invention relates to a method for the treatment of normally gaseous hydrocarbon streams. In a further aspect this invention relates to a method for the separation of ethylene from hydrocarbon streams containing the same. In a further aspect this invention relates to the production of ethylene from hydrocarbon streams. In a further aspect this invention relates to a method for the treatment of a hydrocarbon stream, this treatment producing two streams of salable ethylene of different purities. In a further aspect this invention relates to a process for the production of an ethylene stream containing 99.9 percent ethylene.

Many methods have been designed for the treatment of hydrocarbon streams in order to separate the components thereof by means of efficient temperature control of a series of columns. Due to the partial pressures of the various components, it is difficult to make a separation to give each of the components in a purity desired for subsequent operation. Furthermore, certain of the normally gaseous hydrocarbons are of far greater value than others, and a method which will give a pure stream of these more valuable components is of considerable value.

Ethylene is becoming one of these hydrocarbons of particular value, and is frequently produced by cracking saturated hydrocarbons of lower value. Such a cracking step leads to the production of a mixture of uncracked material, material of higher degrees of unsaturation than ethylene, and heavier materials, both saturated and unsaturated. The separation of ethylene from such a stream is difficult. By a combination of steps hereinafter more fully disclosed and discussed, I have devised a method by which ethylene can be obtained in a very pure state on a commercial scale.

Each of the following objects is obtained by at least one of the aspects of this invention.

It is an object of this invention to separate the components of a hydrocarbon stream. A further object is to produce ethylene in a very pure state. A further object of this invention is to separate ethylene from a hydrocarbon stream containing the same. Still another object of this invention is to separate ethylene from other normally gaseous materials which have boiling points both above and below the boiling point of ethylene.

Other objects and advantages will be apparent to one skilled in the art upon a study of this specification.

Figure 2:
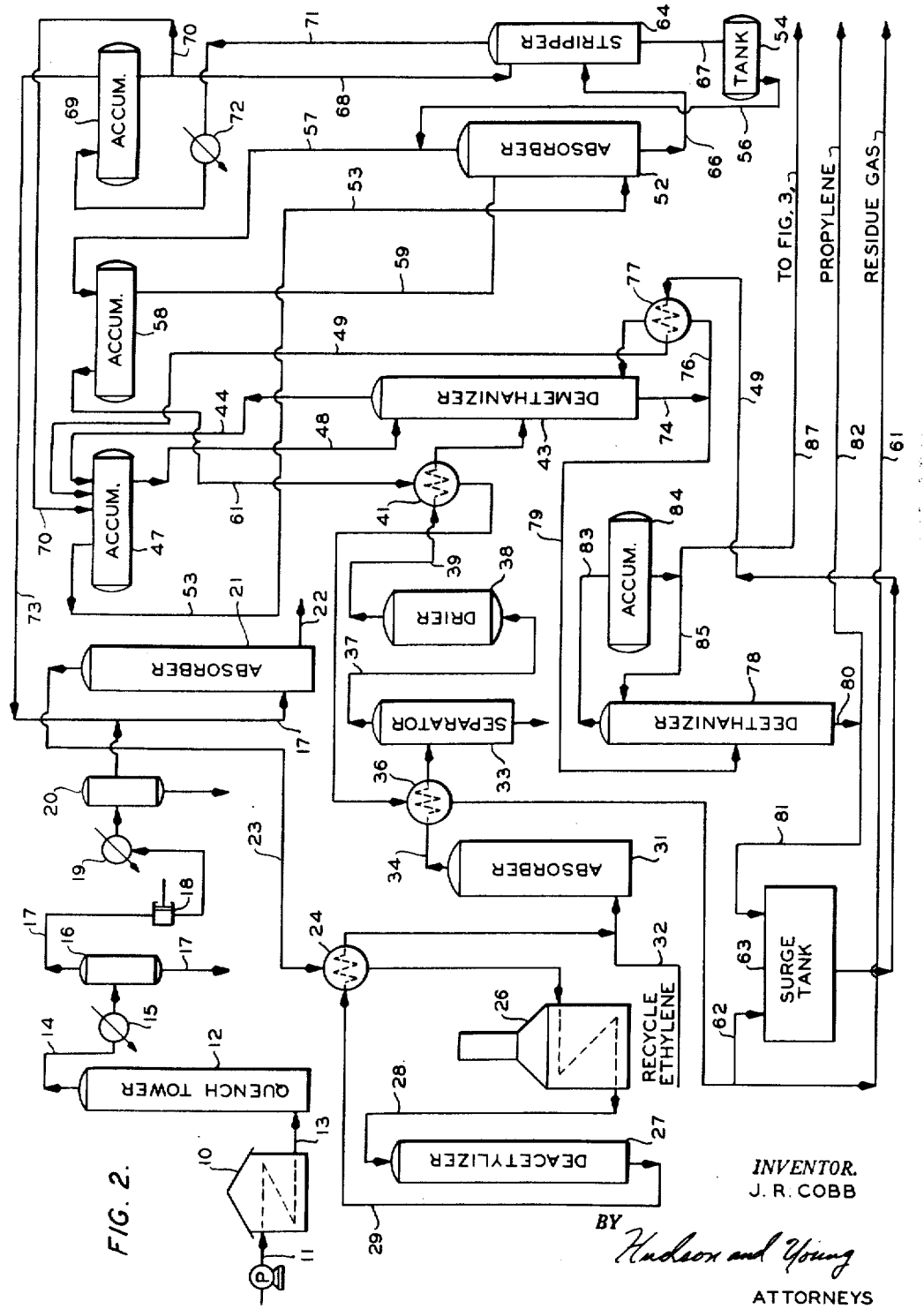
Figure 3:
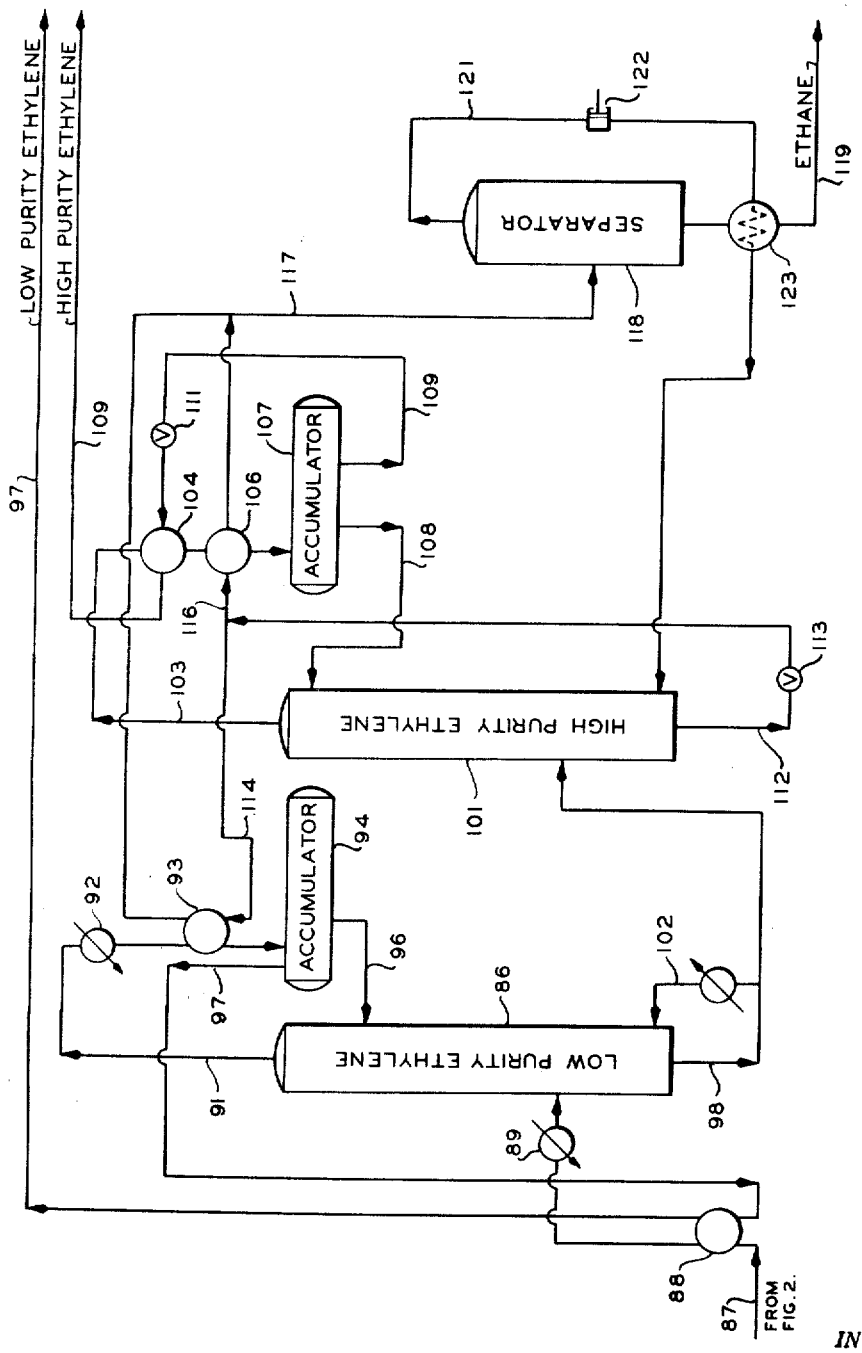

Accompanying this specification, and a part thereof, is a drawing comprising:

Figure 1, which comprises a simplified flow sheet of a preferred modification of this invention, and Figures 2 and 3 which illustrate my invention in more detail, although, it will be apparent, that many pumps, valves, control instruments, and the like are omitted in the interest of simplicity, the addition of such elements being obvious to one skilled in the art.

Previous attempts to prepare a high purity ethylene stream involve the concept of a first cut to remove products lighter than ethylene and a second cut to remove heavier products. While such operation is generally satisfactory where purities of 95 percent ethylene are desired, the losses of the desired product in each of these separations becomes excessively large when it is desired to produce a product of over 99 percent purity.

In the present invention I utilize a process wherein two ethylene streams are produced by means of an "ethylene splitter" or a "low purity ethylene column." In this process, after removal of normally liquid products, a demethanization column removes practically all of the material lighter than ethylene and the bottom stream from this column is then fed to a de-ethanizer where the ethylene is taken overhead as well as the methane not removed in the first column along with some hydrocarbons heavier than ethylene. This overhead stream is fed to the ethylene splitter where a cut is made which takes the methane and some of the ethylene overhead, the amount of this ethylene taken overhead being sufficient to give a product comprising 95 to 98 percent ethylene. In usual operation, the ethylene taken overhead from this ethylene splitter will amount to 10 to 30 percent of the ethylene fed to this column. The bottoms stream, now containing no methane, is fed to the high purity ethylene column wherein the cut is made to remove practically all of the ethylene overhead, a small amount appearing in the kettle product. The ethylene product from this high purity ethylene column is 99.9 percent ethylene, this being of greater purity than has been obtainable in the prior art utilizing commercial methods of separation of cracked gas streams.

In previous processes, the column which I utilize as an ethylene splitter, has been operated as a secondary demethanizer. The disadvantage of such operation is that it requires lower column temperatures and does not give as pure a product. By using higher temperatures and making the deeper cut, as in the present process, these last small amounts of methane are removed with a considerable quantity of ethylene resulting in a salable product.

Attention is now directed to Figure 1 which illustrates a preferred embodiment of the invention. The presentation in this figure is considerably simplified, but is thus presented in order that the invention may be more easily understood. 10 represents a cracking furnace where saturated hydrocarbons can be cracked to produce lower molecular weight products. The effluent from this furnace passes to absorber 21 through conduits 14 and 17, this absorber serving to remove materials of greater molecular weight than propylene from the furnace effluent, these products appearing in conduit 22. The overhead from this absorber passes by means of conduit 23 to deacetylizer 27 wherein acetylenes are removed by hydrogenation. The product stream then is conveyed to carbon dioxide absorber 31 by means of conduit 29. If desired an outside recycle ethylene stream, which it is desired to purify, can be introduced at this point by means of conduit 32. The carbon dioxide absorber overhead passes to demethanizer 43 by means of conduit 34. The major amount of methane and lighter gases is removed overhead to absorber 52 by means of conduit 44. Absorber 52 is supplied with a selective solvent such as hexane which is supplied by means of conduit 59. The overhead from this column is a residue gas stream consisting essentially of methane and lighter gases and appears in conduit 57. Hexane containing absorbed materials is introduced into hexane stripper 64 by means of conduit 66. Lean hexane is removed as a bottom product and reintroduced into absorber 52 by means of conduit 59, the overhead being returned to absorber 21 by means of conduits 71 and 17. The bottom product from demethanizer 43, containing ethylene and heavier hydrocarbons is introduced, by means of conduit 79 to deethanizer 78, this column serving to separate a propylene bottom product appearing in conduit 80 and an overhead consisting of ethane, ethylene, and a small amount of methane appearing overhead in conduit 83. This overhead is conveyed to low purity ethylene column 86.

The operation of column 86 represents the principal distinguishing feature over the methods employed by the prior art. In prior operations the theory has been to operate this column under conditions to remove the last traces of methane while preventing any of the ethylene from going overhead. According to my invention the methane is taken overhead, but the column is operated so that a considerable portion, say 10 to 30 percent, of the product ethylene is also removed overhead. Due to the small amounts of methane present, this product stream, containing ethylene within the above limits, will give a product stream containing ethylene of 95 to 98 percent ethylene. Such a stream is removed by conduit 91. The bottom product from column 86 is introduced into high purity ethylene column 101 through conduit 98. The cut in this column is such that a very high purity ethylene stream is taken overhead, this stream being at least 99.9 percent ethylene through conduit 103 and the ethane, with a minor amount of ethylene appearing as a bottom product in conduit 112.

In the operation of this invention, a preferred method is to crack a butane stream at approximately 1450° F. and at 5 p. s. i. g. to produce a stream containing hydrogen, methane, acetylene, ethylene, ethane, propylene, propane and minor amounts of heavier hydrocarbons. This stream is conveyed to an absorber wherein most of the heavier, normally liquid materials are removed. The gaseous materials are conveyed to a deacetylizer wherein acetylenes are converted into more staturated hydrocarbons by means of catalytic hydrogenation. This can be accomplished by passing them at high temperature, say 500° F. over a hydrogenation catalyst. The next step in the process involves the removal of $CO_2$ and hydrogen sulfide, this being accomplished by treatment with an absorbent, preferably caustic soda. The effluent from the absorber is then demethanized and the demethanized product introduced into a deethanizer. This demethanizer is preferably operated with a selective solvent and propylene is used in the preferred embodiment, since this material is obtained as a product of the process and is readily available. In order to prevent losses of desired materials, I have shown an absorber-stripper combination which serves to accomplish this purpose. Propylene appearing overhead from the demethanizer is absorbed by a second selective solvent, this being in the preferred embodiment, hexane.

The deethanizer is operated so that all $C_2$'s appear overhead and heavier products, these being essentially propylene with minor amounts of propane and heavier hydrocarbons, being removed as a bottom product. This $C_2$ stream, containing a very small amount of methane, is introduced into a column which I operate as an ethylene splitter rather than a secondary demethanization column. Since the amount of methane is small, the addition of a fairly small amount of ethylene gives a product which is suitable for most ethylene applications. In order to obtain ethylene of the very highest purity, which is now desired for many applications, the bottom product from this ethylene splitter is introduced into a second ethylene column wherein practically all of the ethane is removed as a bottoms product, a 99.9 percent ethylene product being obtainable as an overhead from this high purity ethylene column.

In Table I, I have shown the compositions of the various streams appearing in the modification of this invention as illustrated in Figure I. This shows stream composition and relative yields of the materials based on a 24 hour run. All compositions and mol quantities are given on a pound mol basis.

*Table 1*

|  | Feed | Furnace Effluent | Stripper Overhead | Absorber Feed | Absorber Bottom | Deacetylizer Feed | Deacetylizer Effluent | Outside Recycle | Demethanizer Feed |
|---|---|---|---|---|---|---|---|---|---|
| $H_2$ |  | 3,630 | 9 | 3,639 |  | 3,639 | 3,639 |  | 3,639 |
| $CH_4$ |  | 17,446 | 437 | 17,883 |  | 17,883 | 17,883 | 2 | 17,885 |
| $C_2H_2$ |  | 211 |  | 211 |  | 211 |  |  |  |
| $C_2H_4$ |  | 13,464 | 31 | 13,495 |  | 13,495 | 13,341 | 1,087 | 14,428 |
| $C_2H_6$ |  | 2,908 | 5 | 2,913 |  | 2,913 | 3,278 | 6 | 3,284 |
| $C_3H_6$ |  | 6,168 | 22 | 6,190 | 134 | 5,056 | 5,056 |  | 5,056 |
| $C_3H_8$ |  | 238 | 1 | 239 | 7 | 232 | 232 |  | 232 |
| $C_4H_6$ |  | 382 |  | 382 | 345 | 37 | 37 |  | 37 |
| $C_4H_8$ |  | 532 |  | 532 | 481 | 51 | 51 |  | 51 |
| $C_4H_{10}$ | 21,037 | 841 |  | 841 | 760 | 81 | 81 |  | 81 |
| Heavier |  | 1,608 |  | 1,608 | 1,589 | 19 | 19 |  | 19 |
| Total | 21,037 | 47,428 | 505 | 47,933 | 3,316 | 43,617 | 43,617 | 1,095 | 44,712 |

|  | Demethanizer Overhead | Hydrogen and Methane Off-gas | Deethanizer Feed | Propylene Product | Low Purity Ethylene Column Feed | Low Purity Ethylene Column Overhead | High Purity Ethylene Column Feed | High Purity Ethylene Column Overhead | High Purity Ethylene Column Bottoms |
|---|---|---|---|---|---|---|---|---|---|
| $H_2$ | 3,639 | 3,630 |  |  |  |  |  |  |  |
| $CH_4$ | 17,871 | 17,434 | 14 |  | 14 | 14 |  |  |  |
| $C_2H_2$ |  |  |  |  |  |  |  |  |  |
| $C_2H_4$ | 319 | 288 | 14,109 | 19 | 14,090 | 2,076 | 12,014 | 11,959 | 55 |
| $C_2H_6$ | 34 | 29 | 3,250 | 59 | 3,191 | 28 | 3,163 | 11 | 3,152 |
| $C_3H_6$ | 156 | 134 | 4,900 | 4,810 | 90 |  | 90 |  | 90 |
| $C_3H_8$ | 5 | 4 | 227 | 224 | 3 |  | 3 |  | 3 |
| $C_4H_6$ |  |  | 37 | 37 |  |  |  |  |  |
| $C_4H_8$ |  |  | 51 | 51 |  |  |  |  |  |
| $C_4H_{10}$ |  |  | 81 | 81 |  |  |  |  |  |
| Heavier |  |  | 19 | 19 |  |  |  |  |  |
| Total | 22,024 | 21,519 | 22,688 | 5,300 | 17,388 | 2,118 | 15,270 | 11,970 | 3,300 |

It will be apparent that specific temperatures and pressures for operating the various elements of the apparatus employed in this method can be easily determined by one skilled in the art. However I have found that it is preferable to operate the low purity ethylene column, this being the ethylene splitter, which is one of the novel features of my invention, at a temperature of about −64° F. and a pressure of about 132 p. s. i. g. These figures are suitable when the process streams correspond approximately to those given in Figure 1. It will be evident that pressures and temperatures are interrelated and it is not practical to set forth all of the possible variations. Furthermore, the figures set forth above are appropriate where the process streams have the composition given in Table 1, these being merely an example of a preferred operational system.

Attention is now directed to Figures 2 and 3 which illustrate a more complete flowsheet of apparatus used in carrying out the process of my invention. In these figures, 10 represents a standard hydrocarbon cracking furnace, where saturated hydrocarbons such as ethane, propane, butane, and the like may be subjected to high temperatures in order to produce an effluent consisting of cracked hydrocarbons, including unsaturated hydrocarbons. The feed to furnace 10 is by means of conduit 11 and the effluent passes therefrom to quench tower 12 by means of conduit 13. Conduit 14 extends from the upper end of quench tower 12, passing through condenser 15 to knockout drum 16. Entrained water is removed by conduit 17 and the overhead from knockout drum 16 passes to absorber 21 through conduit 17 which has included therein compressor 18, condenser 19, and knockout drum 20. In absorber 21, the heavier, normally liquid hydrocarbons are removed through conduit 22, the gaseous effluent being removed overhead through conduit 23. Conduit 23, after passing through heat exchanger 24 enters preheater 26. The heated effluent from preheater 26 enters a catalytic deacetylizer 27 by means of conduit 28. In deacetylizer 27, acetylenes are hydrogenated to ethylenes or ethanes. The effluent then passes, by means of conduit 29 through heat exchanger 24 to carbon dioxide absorber 31. If desired a recycle ethylene stream from other operations can be introduced at this point by means of conduit 32. The effluent from carbon dioxide absorber 31 is passed to separator 33 by means of conduit 34 after passing through heat exchanger 36. The gaseous effluent from separator 33 passes through conduit 37, dryer 38, conduit 39, heat exchanger 41, to demethanizer 43.

It is in this demethanizer 43 that the first important cut is made in the purification of this gas stream, the major amount of the methane being taken overhead and the ethylene and heavier materials appearing as the kettle product. The methane goes overhead through conduit 44 to accumulator 47, a reflux stream being returned to demethanizer 43 by means of conduit 48. This demethanizer 43 is preferably operated with a selective solvent for materials heavier than methane. In the preferred embodiment of this invention this selective solvent is propylene, this being one of the materials separated as a product in future stages of the method of operation of this invention. This propylene stream can be supplied by means of conduit 49.

In order to insure the highest possible recovery of desired products, the overhead from accumulator 47 is passed to an absorber-stripper system which utilizes a second selective solvent, this being a solvent which will remove and return propylene and lighter materials to the system. For this operation gaseous material from accumulator 47 is passed to absorber 52 by means of conduit 53, this absorber being supplied with, in a preferred modification, hexane as said second selective absorbent, the hexane being supplied from tank 54 by conduits 56 and 57, accumulator 58, and conduit 59. The overhead from absorber 52 passes to accumulator 58 through conduit 57, reflux being supplied to the absorber through conduit 59 along with fresh hexane. The gaseous material recovered as overhead from absorber 52 and appearing in accumulator 58 comprises the residue gas consisting essentially of methane and hydrogen with very small amounts of heavier hydrocarbons is recovered from accumulator 58 by means of conduit 61, this conduit passing through heat exchangers 41 and 36 before being recovered as a product. This residue gas may be utilized as fuel for the furnaces in the plant or may be utilized in other uses well known to the art.

An interesting feature of this invention involves the use of this residue gas as the pressuring means for the selective solvent, preferably propylene, supplied to demethanizer 43. This is accomplished by means of conduit 62 which extends from conduit 61 and to the propylene surge and storage tank 63, propylene being supplied to tank 63 as hereinafter described. Conduit 49 extending from the lower portion of tank 63 supplies selective solvent for demethanizer 43.

Now returning to the absorber 52, the bottoms stream, containing the second selective solvent, preferably hexane, having propylene dissolved therein is conveyed to stripper 64 by means of conduit 66. Lean hexane is removed as a bottom product by means of conduit 67 and introduced into tank 54, previously described. This stripper 64 is supplied with a propylene reflux stream by means of conduit 68, the overhead from this stripper passing to accumulator 69 by means of conduit 71, this conduit containing condenser 72. Gaseous material, consisting principally of ethylene and lighter gases is returned from accumulator 69 to absorber 21 through conduits 73 and 17. Excess propylene can be returned to demethanizer 43 by means of conduit 70 and accumulator 47.

The bottom product from demethanizer 43, comprising an impure ethylene stream is removed by conduit 74, a portion of this stream being returned to the kettle of this column through conduit 76, this conduit having heat exchanger 77 therein, the balance of the product from demethanizer 43 passing to deethanizer 78 through conduit 79. The bottom product from deethanizer 78, consisting essentially of propylene, is removed from this column through conduit 80, a portion being supplied to tank 63 through conduit 81, and the balance appearing as a propylene product in conduit 82.

The deethanizer overhead, containing ethane and heavier hydrocarbons remaining in the material supplied to deethanizer 78 is taken off overhead through conduit 83 and introduced into accumulator 84. From the lower portion of accumulator 84 this material is conveyed to low purity ethylene column 86, a portion, however, being returned through conduit 85 to deethanizer 78. The stream passing through conduit 87 to column 86 is heat exchanged with a product stream hereinafter described in heat exchanger 88 and further cooled by means of an external refrigerant in cooler 89.

All of the remaining methane is removed as an overhead product in column 86. However, in distinction to methods employed in the prior art, this column is not operated under conditions to remove only the methane in this column. Instead, a considerable portion, say 10 to 30 percent, of the ethylene is removed with the methane. Because of the fact that there is only a small amount of methane remaining at this point, removal of such a quantity of ethylene results in an ethylene stream of fairly high purity, say 95 to 98 percent ethylene. This is designated on Figure 3 as the "low purity ethylene" stream. This stream is removed from the upper portion of column 86 by means of conduit 91 and is condensed in cooler 92, heat exchanged with another product stream in heat exchanger 93, and then introduced into accumulator 94. A portion of this ethylene stream is returned to column 86 by means of conduit 96, this serving to supply reflux for this column. Another portion is removed from accumulator 94 by means of conduit 97, this, after passing through heat exchanger 88, appearing as the low purity ethylene stream. The bottom product from ethylene column 86 is removed by conduit 98 and introduced into high purity ethylene column 101, a portion being returned to column 86 through conduit 102 to reboil column 86. The high purity ethylene column 101 is operated to remove practically all of the ethylene as an overhead product in conduit 103, this stream being cooled in heat exchangers 104 and 106 before passing to accumulator 107. Reflux for this column is supplied by conduit 108 extending from accumulator 107. The high purity ethylene is removed from accumulator 107 by means of conduit 109, this passing through expansion valve 111 and heat exchanger 104 before appearing as the high purity ethylene product, this product having a purity of 99.9 percent ethylene. The bottom product from column 101 is conveyed through conduit 112 and passes through expansion valve 113. This stream comprises principally ethane and a very small amount of ethylene. The cooling resulting from the expansion produced as a result of passing through valve 113 cools this stream so that it may be utilized in heat exchangers 93 and 106, the conduit 112 splitting to form conduits 114 and 116 passing to these last mentioned heat exchangers. After passing through these heat exchangers, conduits 114 and 116 unite again to form conduit 117 which passes to separator 118. The major portion of this ethane is removed as the ethane product from the lower portion of separator 118 by means of conduit 119. A portion is removed overhead through conduit 121, compressed in compressor 122, cooled by the ethane product in heat exchanger 123, and returned to the lower end portion of the high purity ethylene column 101 to reboil that column.

While this invention has been described in connection with the present preferred embodiment thereof, it is to be understood that this description is illustrative only and is not included to limit the invention.

I claim:

1. A method of producing at least two ethylene streams of different purities comprising cracking a hydrocarbon stream to produce a stream containing ethylene, hydrogen, and methane and heavier hydrocarbons, passing said cracked gas to an absorption zone to remove the major portion of heavier hydrocarbons, removing an overhead stream from said absorption zone; removing acetylene and carbon dioxide from said overhead; passing said stream to a demethanization zone; removing a high methane content gas as the overhead product of said demethanization zone; passing the kettle product from said demethanization zone to a fractionation zone wherein an ethylene and lighter stream is taken off overhead and an ethane and heavier stream is taken off as a bottom product; passing said ethylene and lighter stream to a first ethylene fractionating zone; removing any remaining methane and sufficient ethylene to give an overhead product of said first ethylene fractionating zone containing 95 to 98 percent ethylene; passing the kettle product from said first ethylene fractionating zone to a second ethylene fractionating zone; removing an ethylene stream of higher purity than said first mentioned ethylene product as an overhead product of said second ethylene fractionating zone and a kettle product containing a small amount of ethylene and products heavier than ethylene.

2. A method of producing at least two ethylene streams of different purities comprising cracking a hydrocarbon stream to produce a stream containing ethylene, hydrogen, and methane and heavier hydrocarbons, passing said cracked gas to an absorption zone to remove the major portion of heavier hydrocarbons, removing an overhead stream from said absorption zone; removing acetylene and carbon dioxide from said overhead; passing said stream to a demethanization zone; removing a high methane content gas as the overhead product of said demethanization zone; passing said high methane content gas to an absorption zone; removing from said absorption zone a residue gas containing substantially all of the methane and lighter gases; passing a kettle product from said absorption zone to a separating zone; returning an ethylene containing gas to said first mentioned absorption zone; passing the kettle product from said demethanization zone to a fractionation zone wherein an ethylene and lighter stream is taken off overhead and an ethane and heavier stream is taken off as a bottom product; passing said ethylene and lighter stream to a first ethylene fractionating zone; removing any remaining methane and sufficient ethylene as an overhead product of said first ethylene fractionating zone to produce a stream containing 95 to 98 percent ethylene; passing the kettle product from said first ethylene fractionating zone to a second ethylene fractionating zone; removing an ethylene stream of higher purity than said first mentioned ethylene stream as an overhead product of said second ethylene fractionating zone and a kettle product containing a small amount of ethylene and products heavier than ethylene.

3. A process for the production of ethylene comprising cracking a saturated hydrocarbon to produce a stream containing hydrogen, methane, acetylene, ethylene, ethane, propylene and heavier hydrocarbons; quenching said gas stream; compressing said gas stream; passing said gas to a first absorber; removing the major proportion of heavier hydrocarbons as a kettle product; removing an overhead stream containing the major proportion of the hydrogen, methane, acetylene, ethylene, ethane and proplyene in said cracked gas stream and a minor amount of heavier hydrocarbons; hydrogenating acetylene in said gas stream; removing carbon dioxide from said gas stream; contacting said gas stream with a first selective solvent in a demethanization zone; passing the overhead from said demethanization zone to an absorption zone for said selective solvent supplied with a second selective solvent; removing a residue gas containing all the hydrogen and substantially all the methane as an unabsorbed product of said first selective solvent absorption zone; passing the kettle product from said first selective solvent absorption zone to a stripping zone; recovering lean second selective solvent from the kettle portion of said stripping zone and returning said material to said first selective solvent absorption zone; cooling the overhead from said stripping zone to condense a portion thereof, the major portion of said condenser portion being said first selective solvent; returning the condensed portion to said demethanization zone; returning the non-condensed portion of said overhead to said first absorber; removing a bottoms stream from said demethanization zone containing propylene, ethylene, ethane, and a small amount of heavier hydrocarbons as a kettle product; passing said last-mentioned stream to a first fractionation zone; recovering a propylene concentrate from the kettle portion of said first fractionation zone; passing the overhead from said first fractionating zone to a second fractionating zone, removing all of the methane and sufficient ethylene as an overhead product of said second fractionating zone to produce an ethylene stream containing 95 to 98 percent ethylene; passing the kettle product from said second fractionating zone to a third fractionating zone; and removing an ethylene stream as an overhead product of higher purity than said first mentioned ethylene stream from said third fractionating zone and a kettle product containing hydrocarbons heavier than ethylene.

4. A process for the production of ethylene comprising cracking a saturated hydrocarbon to produce a stream containing hydrogen, methane, acetylene, ethylene, ethane, propylene and heavier hydrocarbons; quenching said gas stream; compressing said gas stream; passing said gas to a first absorber; removing the major proportion of heavier hydrocarbons as a kettle product; removing an overhead stream containing the major proportion of the hydrogen, methane, acetylene, ethylene, ethane and propylene in said cracked gas stream and a minor amount of heavier hydrocarbons; hydrogenating acetylene in said gas stream; removing carbon dioxide from said gas stream; contacting said gas stream with a propylene absorbent in a demethanization zone; passing the overhead from said demethanization zone to propylene absorption zone supplied with hexane as a selective absorbent; removing a residue gas containing all the hydrogen and substantially all the methane as overhead from said propylene absorption zone; passing the kettle product from said propylene absorption zone to a hexane stripping zone; recovering lean hexane from the kettle portion of said hexane stripping zone and returning said material to said propylene absorber, cooling the overhead from said hexane stripping zone to condense a portion thereof, the major portion of said condensed portion being propylene; returning the condensed portion to said demethanization zone; returning the noncondensed portion of said overhead to said first absorber; removing a bottom stream from said demethanization zone containing propylene having ethylene and ethane dissolved therein and a small amount of heavier hydrocarbons as a kettle product; passing said last mentioned stream to a first fractionation zone; recovering a propylene concentrate from the kettle portion of said first fractionation zone; passing the overhead from said first fractionation zone to a second fractionating zone; removing all of the methane and sufficient ethylene as an overhead product of said second fractionating zone to give an ethylene stream containing 95 to 98 percent ethylene; passing the kettle product from said second fractionating zone to a third fractionating zone; and removing an ethylene stream as an overhead product of higher purity than said first mentioned ethylene stream from said third fractionating zone and a kettle product containing hydrocarbons heavier than ethylene.

5. The process of claim 4 in which the hydrocarbon cracked is butane.

6. The process of claim 4 in which the hydrocarbon cracked is ethane.

7. The process of claim 4 in which said second fractionating zone is operated at a temperature in the upper portion thereof about −64° F. and a pressure of about 132 p. s. i. g.

8. A method of producing a high purity ethylene stream from a feed stream containing ethylene and methane and heavier hydrocarbons, comprising passing said stream to a first fractionating zone, removing overhead a major amount of methane, passing a kettle product from said first fractionating zone to a second fractionating zone, removing overhead all of the methane remaining in said stream and sufficient ethylene to give an overhead product containing at least 95 percent ethylene, passing the kettle product from said second fractionating zone to a third fractionating zone, and removing an ethylene stream of higher purity than said first mentioned ethylene product as an overhead product and a kettle product containing hydrocarbons heavier than ethylene.

9. A method of producing at least two ethylene streams of different purities from a feed stream containing ethylene and methane and heavier hydrocarbons, comprising passing said stream to a first fractionating zone, removing overhead a major amount of methane, passing a kettle product from said first fractionating zone to a second fractionating zone, removing overhead all of the methane remaining in said stream and sufficient ethylene to give an overhead product containing at least 95 percent ethylene, passing the kettle product from said second fractionating zone to a third fractionating zone, and removing an ethylene stream of higher prity than said first mentioned ethylene product as an overhead product and a kettle product containing hydrocarbons heavier than ethylene.

10. The process of claim 9 in which said first fractionating zone is at a temperature in the upper portion thereof of about −64° F. and a pressure of about 132 p. s. i. g.

11. A process for the production of ethylene comprising cracking a saturated hydrocarbon to produce a stream containing hydrogen, methane, acetylene, ethylene, ethane, propylene and heavier hydrocarbons; quenching said gas stream; compressing said gas stream; passing said gas to a first absorber; removing the major proportion of heavier hydrocarbons as a kettle product; removing an overhead stream containing the major proportion of the hydrogen, methane, acetylene, ethylene, ethane and propylene in said cracked gas stream and a minor amount of heavier hydrocarbons; hydrogenating acetylene in said gas stream; removing carbon dioxide from said gas stream, contacting said gas stream with a first selective solvent in a demethanization zone, said first selective solvent being supplied from a surge zone; passing the overhead from said demethanization zone to an absorption zone supplied with a second selective solvent; removing a residue gas containing all the hydrogen and substantially all the methane as an unabsorbed product of said first selective solvent absorption zone; utilizing at least a portion of said residue gas to pressure the first selective solvent supplied to said demethanization zone from said surge zone; passing the kettle product from said first selective solvent absorption zone to a stripping zone; recovering lean second selective solvent from the kettle portion of said stripping zone and returning said material to said first selective solvent absorption zone; cooling the overhead from said stripping zone to condensed a portion thereof, the major portion of said condensed portion being said first selective solvent; returning the condensed portion to said surge zone; returning the non-condensed portion of said overhead to said first absorber; removing a bottoms stream from said demethanization zone containing propylene, ethylene, ethane, and a small amount of heavier hydrocarbons as a kettle product; passing said last mentioned stream to a first fractionation zone; recovering a propylene concentrate from the kettle portion of said first fractionation zone; passing the overhead from said first fractionating zone to a second fractionating zone, removing all of the methane and sufficient ethylene as an overhead product of said second fractionating zone to produce an ethylene stream containing 95 to 98 percent ethylene; passing the kettle product from said second fractionating zone to a third fractionating zone; and removing an ethylene stream as an overhead product of higher purity than first mentioned ethylene stream from said third fractionating zone and a kettle product containing hydrocarbons heavier than ethylene.

12. A process for the production of ethylene comprising cracking a saturated hydrocarbon to produce a stream containing hydrogen, methane, acetylene, ethylene, ethane, propylene and heavier hydrocarbons; quenching said gas stream; compressing said gas stream; passing said gas to a first absorber; removing the major proportion of heavier hydrocarbons as a kettle product; removing an overhead stream containing the major proportion of the hydrogen, methane, acetylene, ethylene, ethane and propylene in said cracked gas stream and a minor amount of heavier hydrocarbons; hydrogenating acetylene in said gas stream; removing carbon dioxide from said gas stream; contacting said gas stream with a propylene absorbent in a demethanization zone, said propylene absorbent being supplied from a surge zone; passing the overhead from said demethanization zone to a propylene absorption zone supplied with hexane as a selective absorbent; removing a residue gas containing all the hydrogen and substantially all the methane as overhead from said propylene absorption zone; utilizing at least a portion of said residue gas to pressure the propylene supplied to said demethanization zone from said surge zone; passing the kettle product from said propylene absorption zone to a hexane stripping zone; recovering lean hexane from the kettle portion of said hexane stripping zone and returning said material to said propylene absorber; cooling the overhead from said hexane stripping zone to condense a portion thereof, the major portion of said condensed portion being propylene; returning the condensed portion to said surge zone; returning the noncondensed portion of said overhead to said first absorber; removing a bottom stream from said demethanization zone containing propylene having ethylene and ethane dissolved therein and a small amount of heavier hydrocarbons as a kettle product; passing said last-mentioned stream to a first fractionation zone; recovering a propylene concentrate from the kettle portion of said first fractionation zone; passing the overhead from said first fractionation zone to a second fractionating zone; removing all of the methane and sufficient ethylene as an overhead product of said second fractionating zone to give an ethylene stream containing 95 to 98 percent ethylene; passing the kettle product from said second fractionating zone to a third fractionating zone; and removing an ethylene stream as an overhead product of higher purity than said first mentioned ethylene stream from said third fractionating zone and a kettle product containing hydrocarbons heavier than ethylene.

13. The process of claim 12 in which the hydrocarbon cracked is butane.

14. The process of claim 12 in which the hydrocarbon cracked is ethane.

15. A method of producing at least 2 ethylene streams of different purities from a feed stream containing ethylene and methane and heavier hydrocarbons, comprising passing said stream to a first fractionating zone, removing overhead a major amount of methane, passing a kettle product from said first fractionating zone to a second fractionating zone, removing overhead all of the methane remaining in said stream and sufficient ethylene to give an overhead product containing at least 95 percent ethylene, said ethylene being at least 10 mol percent of the ethylene feed to said second fractionating zone, passing the kettle product from said second fractionating zone to a third fractionating zone, and removing an ethylene stream of higher purity than said first mentioned ethylene product as a overhead product and a kettle product containing hydrocarbons heavier than ethylene.

16. A method of producing at least 2 ethylene streams of different purities from a feed stream containing ethylene and methane and heavier hydrocarbons, comprising passing said stream to a first fractionating zone, removing overhead a major amount of methane, passing a kettle product from said first fractionating zone to a second fractionating zone, removing overhead all of the methane remaining in said stream and sufficient ethylene to give an overhead product containing at least 95 percent ethylene, said ethylene being at least 10 to 30 mol percent of the ethylene feed to said second fractionating zone, passing the kettle product from said second fractionating zone to a third fractionating zone, and removing an ethylene stream of higher purity than said first mentioned ethylene product as a overhead product and a kettle product containing hydrocarbons heavier than ethylene.

17. A method of producing at least 2 ethylene streams of different purities from a feed stream containing ethylene and methane and heavier hydrocarbons, comprising passing said stream to a first fractionating zone, removing overhead a major amount of methane, passing a kettle product from said first fractionating zone to a second fractionating zone, removing overhead all of the methane remaining in said stream and sufficient ethylene to give an overhead product containing at least 95 percent ethylene, passing the kettle product from said second fractionating zone to a third fractionating zone, and removing an ethylene stream containing at least 99.9 percent ethylene as an overhead product and a kettle product containing hydrocarbon heavier than ethylene.

References Cited in the file of this patent

UNITED STATES PATENTS

| | | |
|---|---|---|
| 2,335,855 | Hall | Dec. 7, 1943 |
| 2,360,463 | Arveson | Oct. 17, 1944 |
| 2,500,353 | Gantt | Mar. 14, 1950 |
| 2,514,294 | Rupp | July 4, 1950 |
| 2,588,323 | Kniel | Mar. 4, 1952 |
| 2,652,439 | Neuhart et al. | Sept. 15, 1953 |
| 2,672,489 | Holland | Mar. 16, 1954 |

UNITED STATES PATENT OFFICE
CERTIFICATE OF CORRECTION

Patent No. 2,813,920

November 19, 1957

Joseph R. Cobb, Jr.

It is hereby certified that error appears in the printed specification of the above numbered patent requiring correction and that the said Letters Patent should read as corrected below.

Column 3, line 68, for "staturated" read --saturated--; column 8, line 36, for "condenser" read --condensed--; column 9, line 30, after "thereof" insert --of--; line 57, for "prity" read --purity--; column 10, line 17, for "condensed" read --condense--.

Signed and sealed this 18th day of February 1958.

(SEAL)
Attest:
KARL H. AXLINE
Attesting Officer

ROBERT C. WATSON
Commissioner of Patents